THOMAS P. RUDY
TOSHIO WILLIAM NAKAGAWA
INVENTORS.

United States Patent Office 3,427,351
Patented Feb. 11, 1969

3,427,351
LIQUID-SATURATED CARBOXYLATED ELASTOMERS AND PROCESS OF MANUFACTURING
Toshio William Nakagawa, San Jose, and Thomas P. Rudy, Saratoga, Calif., assignors to United Aircraft Corporation, East Hartford, Conn., a corporation of Delaware
Continuation-in-part of application Ser. No. 357,147, Apr. 3, 1964. This application Oct. 10, 1966, Ser. No. 585,513
U.S. Cl. 260—537
Int. Cl. C07c 55/02; C08f 3/00
7 Claims

ABSTRACT OF THE DISCLOSURE

A carboxy-terminated polymer of the general structural formula:

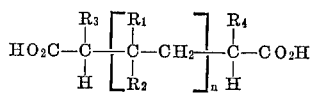

wherein $R_1$ and $R_2$ are lower alkyl groups containing from 1–10 carbon atoms, $R_3$ and $R_4$ are selected from the group consisting of hydrogen and lower alkyl groups and $n$ is an integer from 4 to 250 inclusive. The compound is synthesized by copolymerizing a monoolefin of the formula:

with an acyclic conjugated diene, subjecting the copolymer formed to ozonolysis to cleave the polymer at the double bonds and oxidizing the termine of the cleavage products to carboxylic acid groups.

BACKGROUND OF THE INVENTION

This invention relates to new and useful composition of matter and to methods for preparation thereof and is a continuation in part of our copending coassigned patent application Ser. No. 357,147, filed Apr. 3, 1964, for Elastomer. More particularly, this invention relates to novel carboxy-terminated polymers derived from a copolymer of an isoalkene and an acyclic conjugated diene and suitable processes for the manufacture of such carboxy-terminated polymers.

It has been discovered that these new liquid polymers are readily cured by reaction with conventional cross-linking agents for carboxylated polymers to produce tough, elastic gum stocks possessing excellent mechanical and chemical properties. The cured polymers are suitable for a wide variety of applications which range from use as caulking or sealing compounds to utilization as binder matrices for pyrotechnic devices.

The desirable mechanical properties of the cured polymers are attributable to the low crystallinity of the branched, paraffinic backbone; and the chemical stability thereof stems from the absence of olefinic unsaturation or tertiary hydrogen atoms in the polymer chain, thereby reducing its susceptibility to attack by oxygen and other reagents. In addition, the polymers in the uncured state have readily controlled viscosity making them highly suitable as binder matrices for entrainment of a wide variety of solid phase materials to produce stable, solid admixtures on curing.

It is an object, therefore, of the present invention to provide new and useful liquid polymers which are readily cross-linked to produce solid elastomeric polymers possessing stable physical and chemical properties.

Another object of this invention is to provide suitable methods for the preparation of said liquid polymers and to provide appropriate cross-linking techniques therefor.

Yet another object of the present invention is to produce liquid polymeric materials which have readily controlled viscosity making them highly suitable as binder phases in admixture with solids.

It is still another object to produce cross-linked polymers which are resistant to attack and degradation by entrained oxidants and other reagents.

Figure 1:
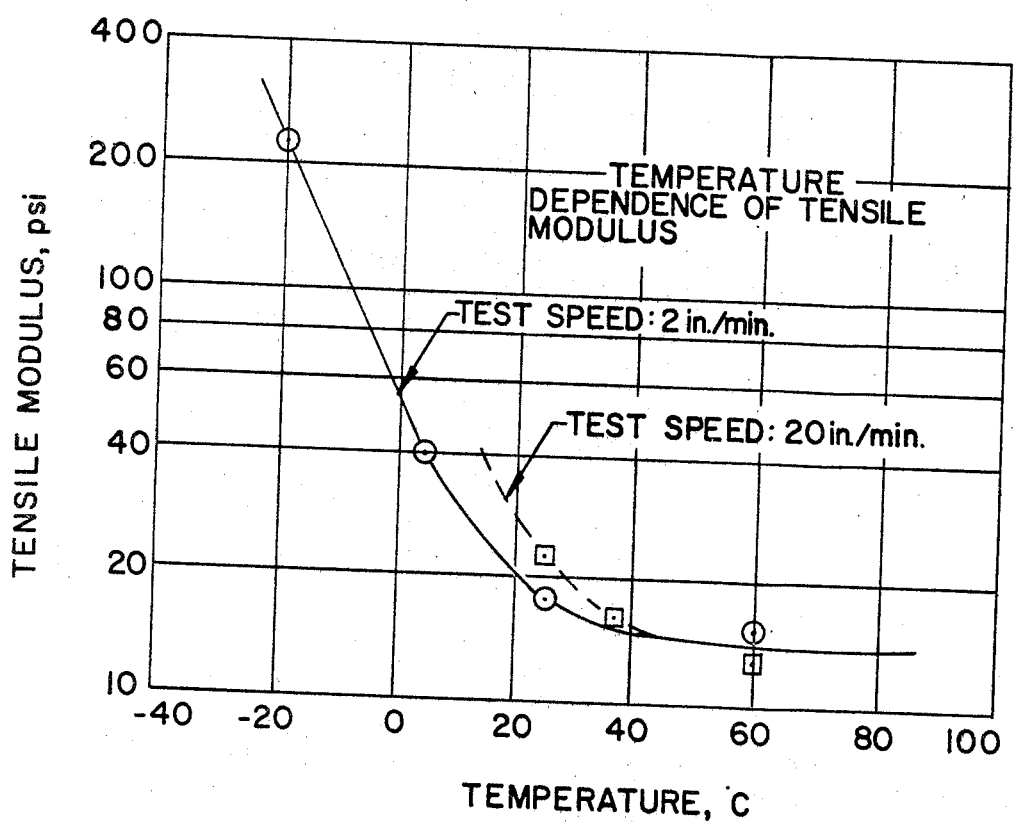
Figure 2:
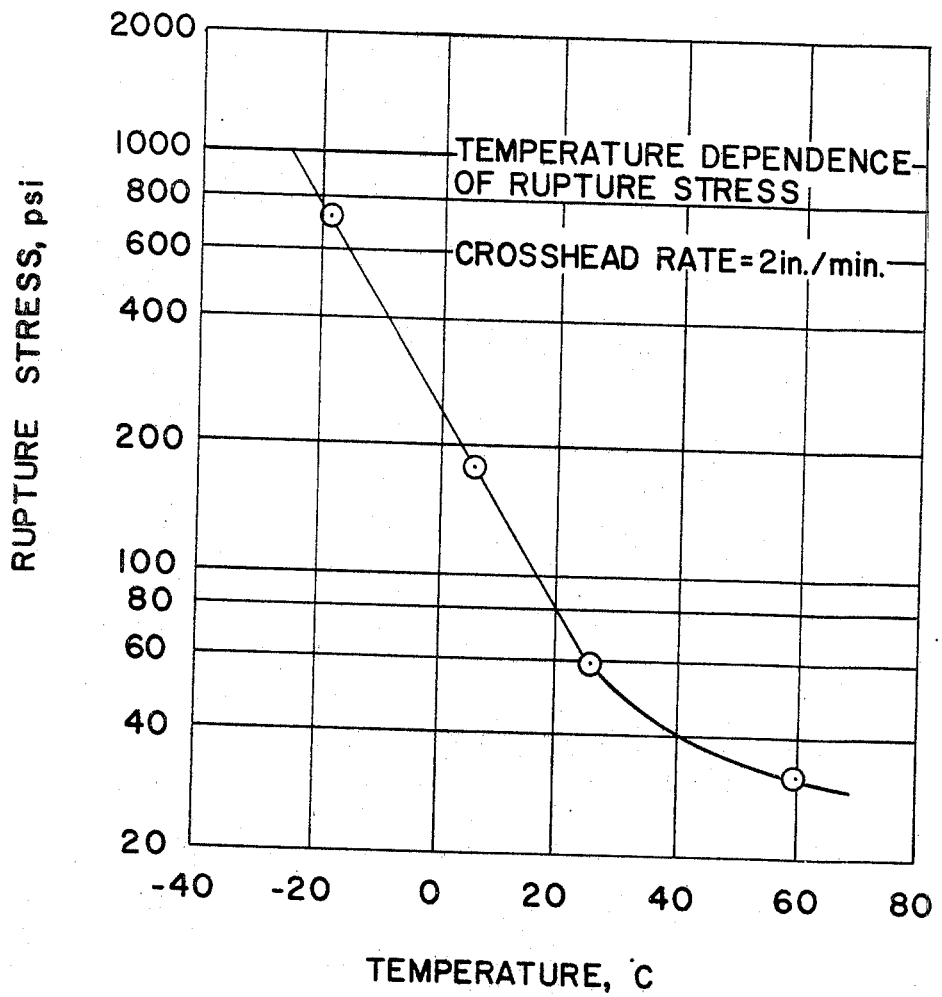
Figure 3:
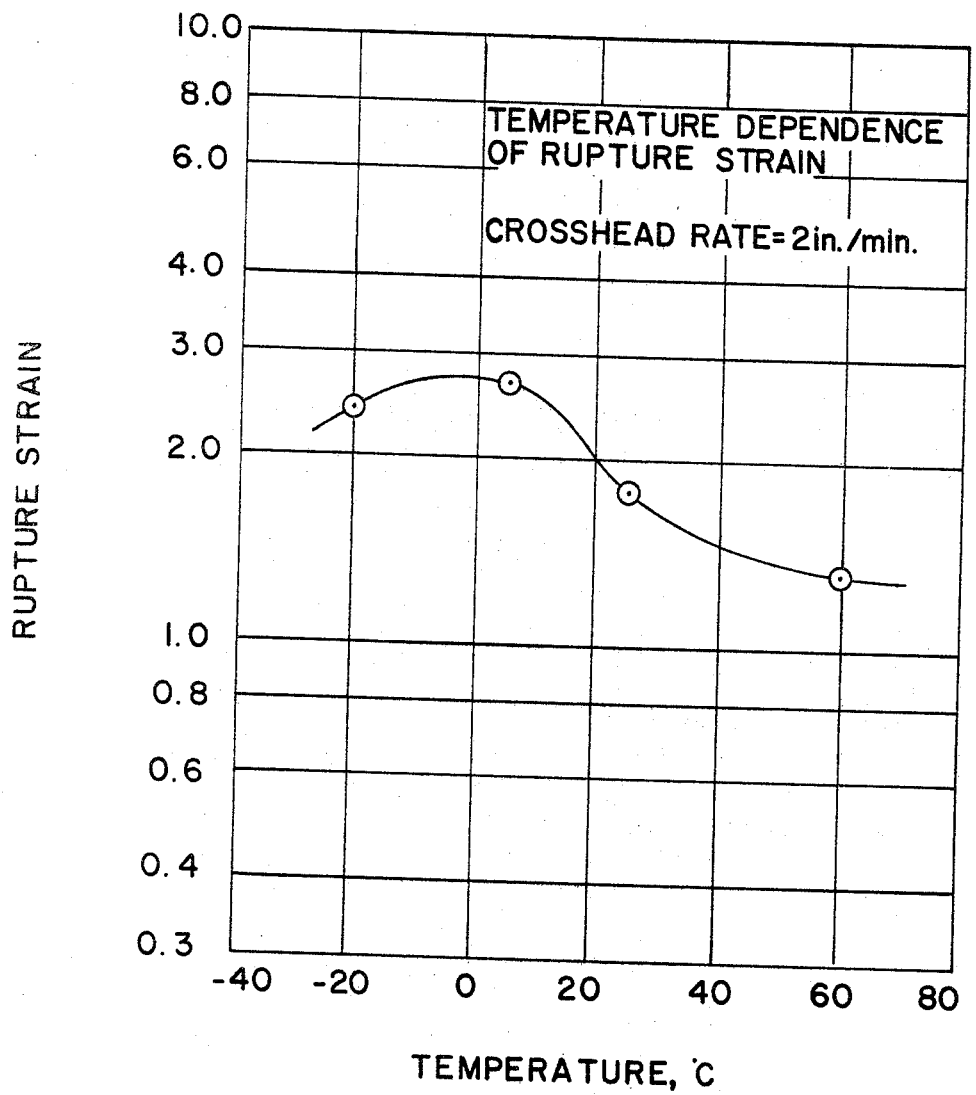

These and other objects of the present invention will become more readily apparent from the detailed description set forth hereinbelow with reference to the accompanying drawing wherein:

FIGURE 1 is a plot of tensile modulus v. temperature of a cured polymer according to this invention, FIGURE 2 is a plot of rupture stress v. temperature of a cured polymer according to this invention, and FIGURE 3 is a plot of rupture strain v. temperature of a cured polymer according to this invention.

DESCRIPTION OF THE INVENTION

The foregoing objects are realized by the proper synthesis and cross-linking of the new and unique liquid carboxy-terminated polymers of this invention. Ordinarily, synthesis of a desired polymeric structure is achieved solely by the linking of low molecular weight species of form chains or networks of high molecular weight. Occasionally, the linking reactions are initiated and terminated in such a manner as to produce useful functional groups at chain termini. However, there is no known synthetic method of this sort which permits practical synthesis of the liquid polymers of the present invention. Instead, an unorthodox technique, comprising precise and controlled degradation of high molecular weight polymers is utilized. One preferred method of synthesis of these polymers calls for, broadly, the copolymerization of an isoalkene such as isobutylene and an acrylic conjugated diene such as butadiene catalyzed by a Lewis acid to form an intermediate copolymer which is then subjected to carefully controlled ozonolysis and oxidation to effect chain scission at each double bond and create carboxylic acid terminal groups on the resulting shorter chains; the resulting polymers having the general formula:

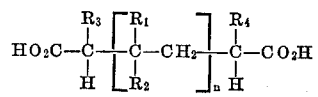

wherein $n$ is an integer greater than 2 and $R_1$ and $R_2$ are alkyl groups containing from 1–10 carbon atoms and $R_3$ and $R_4$ are hydrogen or lower alkyl groups, the preferable alkyl group being methyl.

Formulation of the intermediate copolymer proceeds according to reaction (1) wherein $R_5$ and $R_6$ are hydrogen or methyl groups

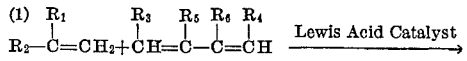

Isoalkene  Acylic Conjugated Diene

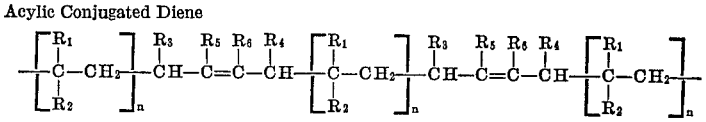

Intermediate Isoalkene Conjugated Diene Copolymer

Any of the acyclic conjugated diolefins cited by Thomas and Sparks in U.S. Patent No. 2,356,128 may be employed as the conjugated diene in this invention. Suitable compounds include but are not limited to butadiene, 1,3-pentadiene, 2,4-hexadiene, isoprene and 2,3-dimethyl-1,3-butadiene.

Although boron trifluoride, $BF_3$, is a preferred catalyst for the copolymerization, a wide variety of other Lewis acid catalysts may be employed such as those described in C. E. Schildknecht, "High Polymers Vol. X," Polymer Processes, p. 201, Interscience, New York, 1953.

Carefully controlled ozonolysis of the intermediate copolymer synthesized by reaction (1) and oxidation of the ozonolysis product produces a carboxyterminated derivative of the copolymer. Although this two stage process may be simply represented by reaction (2) below, the actual course of the reaction is extremely complicated, and careful control of the reaction is required to obtain a useful product.

For copolymers of isobutylene with conjugated dienes in which one or both of $R_5$ and $R_6$ are alkyl groups (e.g. isoprene and 2,3-dimethyl-1-3-butadiene) especially rigorous oxidation procedures are required in the oxida-

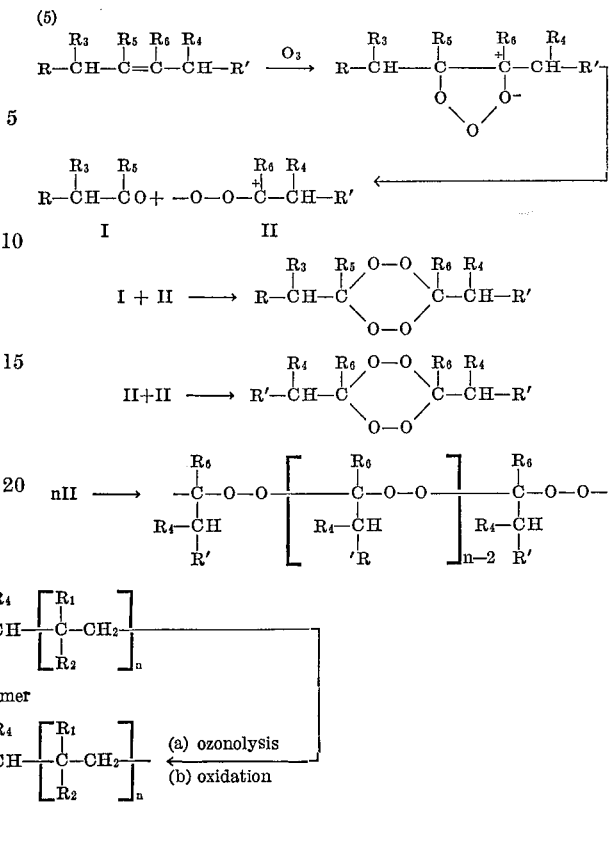

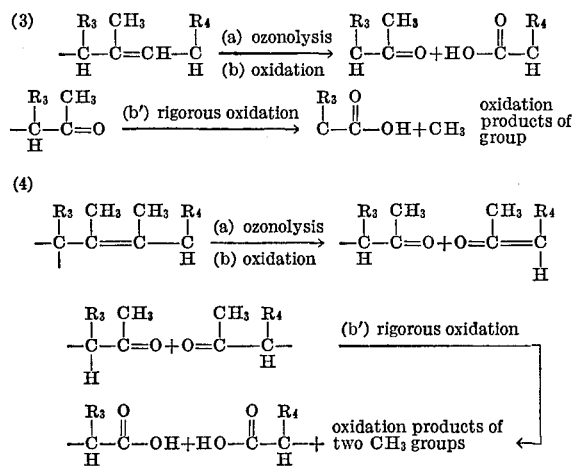

Carboxyterminated Polyisoalkene tion step of reaction sequence (2). This requirement stems from the necessity of conversion of intermediate acetyl (methyl ketone) terminal groups to carboxylic groups as illustrated in reaction sequences (3) and (4).

At elevated temperatures, concentrated nitric acid is a suitable reagent for the rigorous oxidation. However, the haloform reaction (oxidation by salts of hypohalous acids) is preferred since it is specific for methyl ketones.

P. S. Bailey in Chemical Reviews, vol. 58, p. 925 (1958) describes presently accepted mechanisms for ozonolysis reactions and oxidation of ozonolysis products. These mechanisms suggest that a host of intermediate species are produced in reaction sequence (2). Simplified representations of likely structures are shown in reaction sequence (5). It is to be understood that in the polymeric system under consideration, the indicated interactions occur at many sites throughout a macromolecular system.

The complex species resulting from reaction sequence (5) can decompose thermally or react under a variety of conditions to produce terminal groups other than carboxyl or groups which may be oxidized to carboxyl groups. Among the undesirable species that may be produced even under nominally oxidizing conditions are hydrocarbons and oxidation resistant ketones as well as uncharacterized condensation products and tars. The effect of such undesired side reactions is to reduce the attainable average carboxylic acid functionality of the final product below the desired value of two. Resulting species of low functionality are difficult or impossible to separate from desirable species. Although it is well recognized in the art (e.g. P. J. Flory, "Principles of Polymer Chemistry," chaper IX, Cornell University Press, Ithaca, 1953) that an exact lower limit of useful average functionality cannot be specified with certainty in polymeric materials such as those of the present invention, it is well accepted that any decrease in functionality results in decreased capability of being cross-linked (curability) and degraded physical properties of the cured composition. In fact, a number of ordinarily acceptable oxidation procedures have been found to lead to products which cannot be cured. Since such reactions are completely unsuitable for the purposes of this invention, it is necessary that the detailed procedures below be carefully followed in order that one skilled in the art may initially synthesize the liquid polymers of the present invention. Appropriate modification of and variations on the basic process set forth below will readily occur to the skilled artisan.

Initially, the intermediate copolymer of Equation 1 is prepared by a method similar to that of R. M. Thomas and W. J. Sparks, U.S. Patent No. 2,356,128. While the following specific examples utilize butadiene and isoprene as the conjugated diene, it is recognized that any of the conjugated dienes cited in the above-mentioned Thomas et al. patent can be employed according to this invention.

EXAMPLE 1

A one-liter, four-necked resin kettle is fitted with a sealed stirrer, gas inlet dip tube, sampling port with rubber septum closure, and a Dry Ice condenser. The apparatus is dried by purging with anhydrous nitrogen gas, and the kettle is then cooled by means of a Dry Ice-acetone bath. Through a BaO—CaSO$_4$ drying tube, the following gases are charged to, and condensed in, the resin kettle: methyl chloride, 300 gm.; isobutylene, 42 gm.; 1,3-butadiene, 176 gm. Small increments of boron trifluoride gas are added to the stirred mixture until gas-liquid chromatographic analysis of the reaction mixture (sampled through the rubber septum) indicates conversion of 25–50 percent of the isobutylene. The reaction is then positively terminated by addition of 25 ml. of methanol which has been cooled to the temperature of the reaction mixture. The Dry Ice trap and the kettle cooling bath are removed, and volatile constituents of the reaction mixture are allowed to evaporate. The polymer residue is removed from the kettle by use of 200 ml. of carbon tetrachloride solvent, and all volatile constituents are then removed by use of a rotating evaporator. The yield of solvent-free copolymer is 10–20 gm. with number average molecular weight greater than 40,000 by viscometric measurements. On the basis of monomer consumption and reaction with ozone, the copolymer contains approximately 97 percent by weight isobutylene and 3 percent by weight butadiene.

This intermediate rubbery copolymer is converted to the liquid polymer of the present invention by the following procedure. The total product of the foregoing copolymerization is dissolved in 200 ml. of carbon tetrachloride, and the solution is placed in a gas absorption flask equipped with a fritted glass inlet tube. The flask is placed in an ice bath and a stream of oxygen gas containing 2.7 percent by weight ozone is passed through the soluiton at a rate of 0.016 cubic feet per minute for a period of three hours or approximately one hour after the blue color of unreacted ozone is discernable in the gas absorption flask. The flow of ozone is terminated and the reaction mixture is freed of excess ozone by purging with pure oxygen gas. The reaction mixture is placed in a 500 ml. flask equipped with stirrer and thermometer. To the vigorously stirred solution, 50 ml. of fuming nitric acid (specific gravity 1.49–1.50) is added drop-wise at such a rate that the temperature does not exceed 35° C. After the addition of nitric acid is complete, stirring is continued for an additional hour. The reaction mixture is extracted five times with 200 ml. portions of a saturated aqueous solution of sodium chloride, and the extracts are discarded. The remaining carbon tetrachloride solution is dried first over anhydrous sodium sulfate and finally by passage through a column of activated silica gel. The dried solution is stripped of solvent by means of a rotating evaporator, and the product is freed of residual solvent by passage through a wiped film molecular still at a wall temperature of 100° C. and a pressure of 50 microns. The resulting product is 10–15 gm. of a terminally carboxylated polyisobutylene, alpha,omega-bis(methylenecarboxyl) polyisobutylene, of approximately 2000 molecular weight (number average by vapor pressure osmometry), and 1000 equivalent weight ( by titration with standard base). The infrared spectrum of the product differs from that of polyisobutylene in only one important respect: an additional absorption at 1715 cm.$^{-1}$ appears. This is characteristic of the C=O stretching frequency of carboxyl groups. As shown in Table I below, the product has the following viscosity-temperature properties as determined with a Brookfield RVT 7-speed viscometer equipped with a Helipath TF spindle.

Table I

| Temperature, ° F. | Viscosity, poises |
|---|---|
| 69 | 8000 |
| 104 | 880 |
| 144 | 95 |
| 204 | 13 |

EXAMPLE 2

Using the apparatus described in the preceding example, a copolymer of isobutylene and isoprene is prepared. The technique of preparation differs from the foregoing procedure only in the following respects. The cooled resin kettle is charged with 250 ml. of methyl chloride and 63 gm. of isobutylene. Isoprene (8.16 gm.) is then added through the rubber septum by means of a syringe. Small increments of boron trifluoride gas are added to the stirred mixture until approximately 30 percent of the isobutylene is converted to polymer. At this point the reaction is terminated by addition of cold methanol. The resulting copolymer is worked up in the manner described previously.

Conversion of the copolymer of isobutylene and isoprene to terminally carboxylated polyisobutylene requires the following modifications of the previously described procedure. The copolymer is dissolved in a solution of 50 ml. of glacial acetic acid in 150 ml. of carbon tetrachloride. After ozonization is complete, 50 ml. of an 88 percent by weight solution of formic acid in water and 25 ml. of a 30 percent by weight solution of hydrogen peroxide in water are added to the reaction mixture. The mixture is refluxed for two hours and then cooled to room temperature. The carbon tetrachloride phase is separated and repeatedly washed with a saturated aqueous solution of sodium chloride until the washings are neutral. The carbon tetrachloride solution is then dried over anhydrous sodium sulfate and then freed of solvent in a rotating evaporator. The product is redissolved in 50 ml. of 1,4-dioxane, and the solution is added drop-wise with stirring to 0.02 mole of sodium hypobromite solution (prepared as described in "Organic Syntheses," H. Gilman, editor, collective vol. I, p. 526, John Wiley and Sons, New York, 1941). Throughout the addition and for one hour thereafter the stirred mixture is maintained at a temperature below 10° C. The stirred mixture is allowed warm to room temperature, and after two hours is heated to the reflux temperature and so maintained for thirty minutes. The mixture is cooled to room temperature, carefully acidified with concentrated hydrochloric acid and extracted with carbon tetrachloride. The extract is dried over anhydrous sodium sulfate and then freed of solvent in a rotary evaporator. The product, terminally carboxylated polyisobutylene, has a molecular weight of 1445 (number average by vapor pressure osmometry) and an equivalent weight of 669 gm. per carboxyl group.

The above examples illustrate the invention with respect to both straight chain and branched chain conjugated dienes having 4 and 5 carbon atoms. Higher molecular weight conjugated dienes such as 2,3-dimethyl, 1,3-butadiene and 2,4-hexadiene can also be employed according to this invention, the latter compound producing a composition having the following structure:

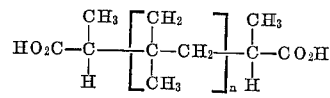

The choice of the conjugated diene employed, however, is primarily economic and conjugated dienes containing 4 or 5 carbon atoms are preferred due to their commercial availability.

A variety of cross-linking agents are suitable for curing the liquid polymers of the present invention. A review of methods of curing carboxyl-terminated polymers has been published by H. P. Brown in Rubber Chemistry and Technology, vol. 36, p. 931 (1963). Other suitable curatives are suggested in U.S. Patent No. 3,074,917 by W. B. Reynolds, issued on Jan. 22, 1963.

Especially useful cured forms of the polymers of this invention may be prepared by admixture with 1.1 equivalents of [tris 1-(2-methyl)aziridinyl]phosphine oxide and maintaining the mixture at 70° C. for 48 hours.

Mechanical properties of a representative resulting cured gum stock as determined by an Instron Universal Tester are shown in FIGURES 1, 2 and 3. A well-recognized criterion of the presence of a cross-linked structure in an elastomeric material is the existence of a threshold temperature at which the tensile modulus becomes independent of strain rate. A plot of tensile modulus against temperature for two test speeds is shown in FIGURE 1. This graph clearly demonstrates that the modulus becomes independent of both the test rate and temperature at approximately 50° C., indicating that the cured composition is, in fact, a cross-linked structure. The breaking strength (rupture stress) and elongation at break (rupture strain) are plotted as functions of temperature in FIGURES 2 and 3, respectively. These curves indicate that the ultimate properties of the cured composition are comparable to those of analogous compositions prepared from commercially available terminally dicarboxyl polybutadiene.

Properties of the cross-linked polymers can be controlled by use of differing cross-linking agents, variation of cure stoichiometry and employment of plasticizers. Control also can be effected by alteration of the average molecular weight (chain length) of the novel carboxy-terminated polymers. Within wide limits, the average chain length (determined by the value of $n$ in Equation 1) may be altered by changing the ratio of isoalkene to conjugated diene in the copolymerization reaction. Alternatively, it is possible to isolate polymer fractions of differing molecular weight by selective precipitation or gradient elution techniques (cf. R. W. Hall, "Fractionation of High Polymers," Techniques of Polymer Characterization, edited by P. W. Allen, pp. 47–53, Butterworths, London, 1959). When the value of $n$ in Equation 1 exceeds about 250, the viscosity of the liquid polymers becomes so great as to interfere with manipulation and processing. On the other hand, when $n$ is three or less, cured compositions produced by ordinary cross-linking agents suffer from limited elasticity. Thus the preferred range of the value of $n$ is from 4–250 and optimum properties are usually obtained when $n$ is in the range of 10–50.

The unexpectedly rapid change of viscosity of the liquid polymers of the present invention with temperature illustrated in Table I is very useful for preparation of compositions in which uniform distribution solid particulate material is desired. At elevated temperatures, the low viscosity of the polymers facilitates wetting of the particulate material and therefore permits attainment of high solids loading. When such compositions are cooled, however, the markedly increased viscosity of the polymers retards gravitational separation of suspended solid particles with densities which differ from that of the matrix. Thus homogeneity of the composition is favored.

Other analogous reactive polymers may be prepared by use of isoalkenes other than isobutylene in the synthesis of the intermediate copolymer. A variety of suitable isoalkenes or mixtures of isoalkenes will suggest themselves to one skilled in the art. Such isoalkenes are those of the general structural formula

wherein $R_1$ and $R_2$ are alkyl groups containing one to ten carbon atoms with the lower numbers being preferred to avoid problems arising from high viscosity of the terminally carboxylated polyolefin product.

Having thus described the invention and the preferred methods for preparation, it will be appreciated by those skilled in the art that many variations and modifications in the methods for manufacturing the reactive polymer are feasible. It is understood that no undue limitations or restrictions are to be drawn by reason of the examples as considerable modification thereof is within the scope of the invention.

We claim:
1. A compound of the general formula:

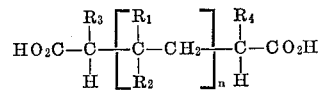

wherein $R_1$ and $R_2$ are lower alkyl groups containing from 1–10 carbon atoms, $R_3$ and $R_4$ are selected from the group consisting of hydrogen and lower alkyl groups and $n$ is an integer from 4 to 250 inclusive.

2. The compound of claim 1 wherein $n$ is an integer from 10–50.

3. The compound of claim 1 wherein $R_1$ and $R_2$ are methyl groups.

4. The compound of claim 3 wherein $R_3$ and $R_4$ are hydrogen.

5. The compound of claim 3 wherein $R_3$ and $R_4$ are methyl groups.

6. A method for producing a carboxy-terminated polymer having a saturated backbone which comprises:
(a) copolymerizing an isoalkene of the general formula

wherein $R_1$ and $R_2$ are lower alkyl groups containing from 1 to 10 carbon atoms with an acyclic conjugated diene, the mol ratio of the copolymerized isoalkene to the copolymerized acyclic conjugated diene being in the range of from 4:1 to 250:1,
(b) cleaving the copolymer so produced at the double bonds by ozonolysis,
(c) oxidizing the termine of the cleavage products to carboxylic acid groups, and
(d) recovering the carboxy-terminated polymer so produced.

7. The process of claim 6 wherein said monoolefin is isobutylene and said conjugated diene is selected from the group of acyclic conjugated dienes containing 4 and 5 carbon atoms.

References Cited

UNITED STATES PATENTS

| | | | |
|---|---|---|---|
| 2,665,280 | 1/1954 | Knobloch et al. | 260—533 |
| 3,049,523 | 8/1962 | Roussel | 260—533 |
| 3,346,631 | 10/1967 | Boyer et al. | 260—533 X |

OTHER REFERENCES

Marvel et al.: J. Org. Chem., 16, 1951, pp. 838–851.
Long: Chem. Reviews, 27, 1940, pp. 450–451.

LORRAINE A. WEINBERGER, Primary Examiner.
VIVIAN GARNER, Assistant Examiner.

U.S. Cl. X.R.

260—78.4, 533, 597